Oct. 16, 1923.  
S. CRESSEY  
REVERSING MECHANISM  
Filed April 25, 1922  
1,471,245  
2 Sheets-Sheet 1
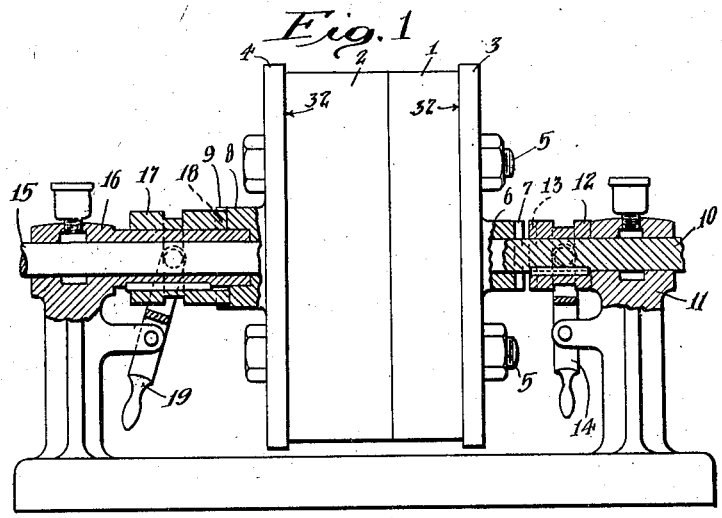
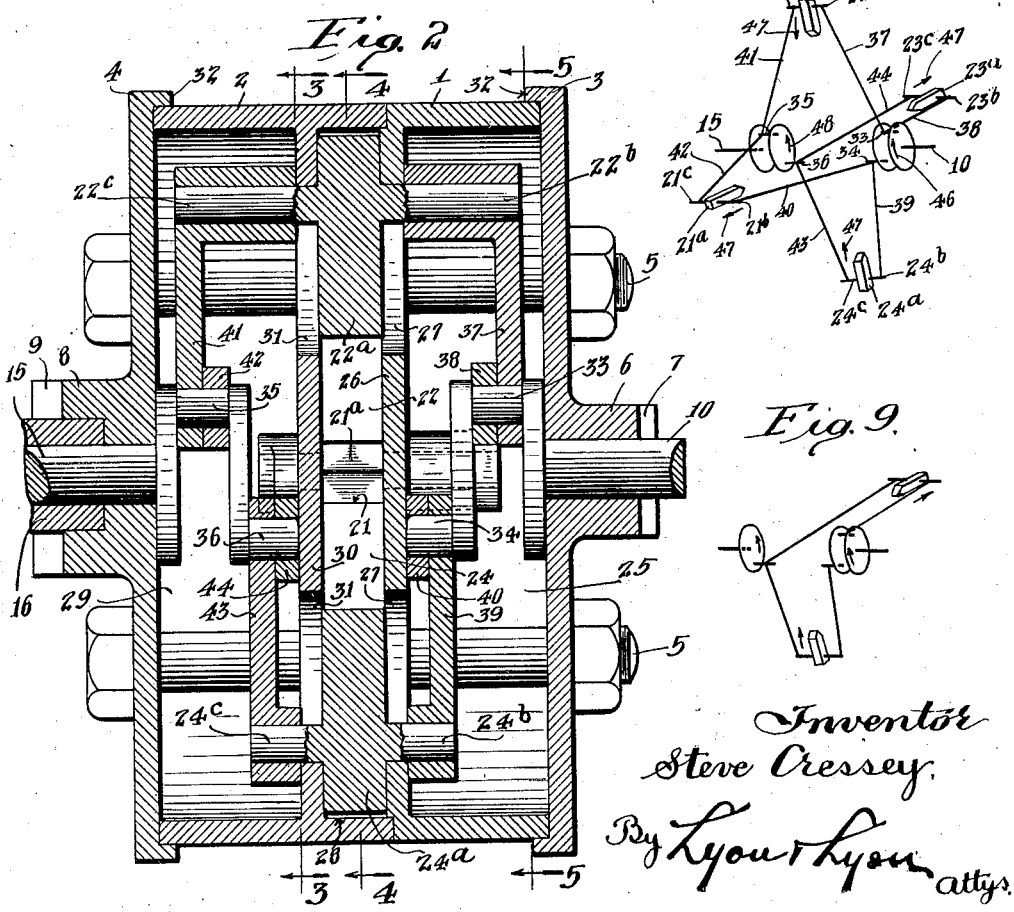
Inventor  
Steve Cressey,  
By Lyon & Lyon  
attys.

Oct. 16, 1923.                                            1,471,245
                        S. CRESSEY
                   REVERSING MECHANISM
             Filed April 25, 1922        2 Sheets-Sheet 2
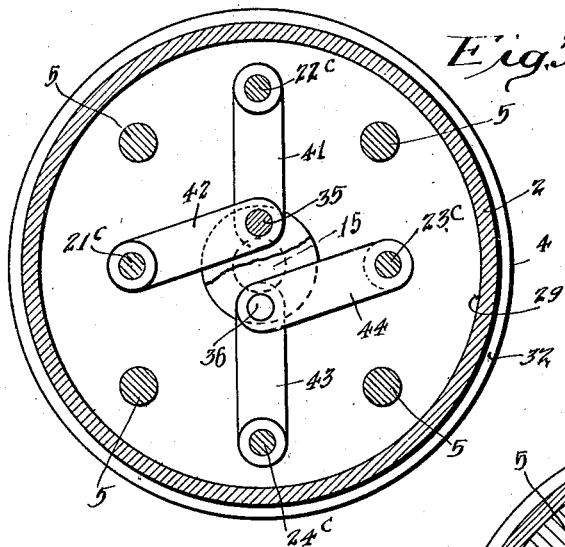
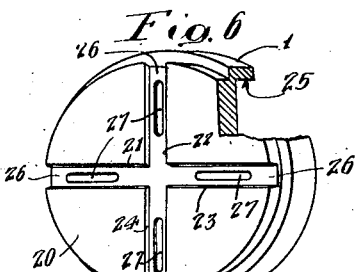
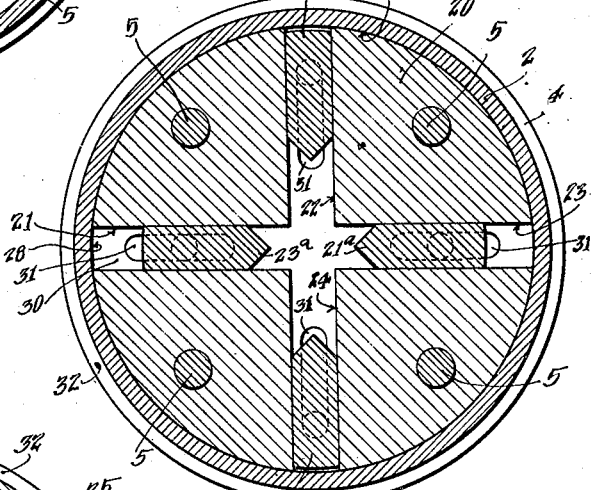
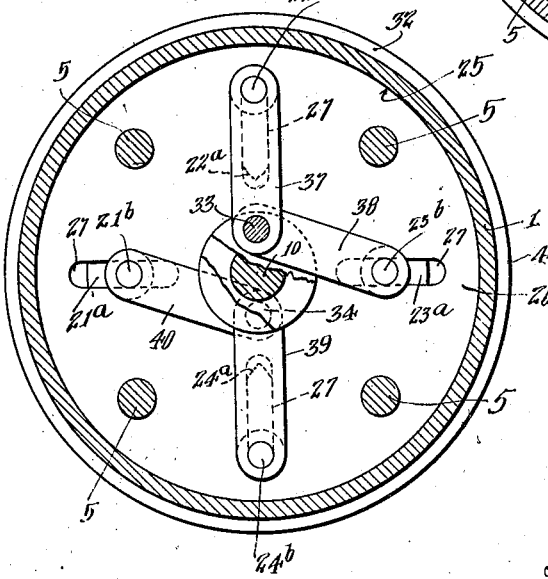
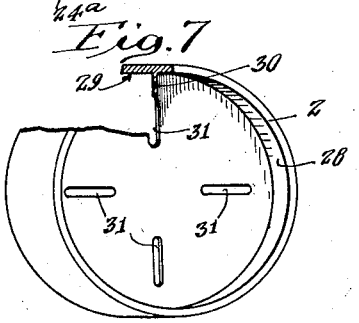
Inventor
Steve Cressey.
By Lyon & Lyon attys Patented Oct. 16, 1923.

1,471,245

UNITED STATES PATENT OFFICE.

STEVE CRESSEY, OF SAN PEDRO, CALIFORNIA.

REVERSING MECHANISM.

Application filed April 25, 1922. Serial No. 556,495.

*To all whom it may concern:*

Be it known that I, STEVE CRESSEY, a citizen of the United States, residing at San Pedro, in the county of Los Angeles and State of California, have invented a new and useful Reversing Mechanism, of which the following is a specification.

This invention relates to reversing mechanisms and is particularly directed to a rotary device providing a reverse rotation of a driven shaft.

An object of the invention is to provide a device associated with a driving shaft and functioning to produce a reverse rotation of a driven shaft without employment of gearing or friction drive elements and which provides a positive driving connection between the drive and driven shafts.

Another object is to provide a device in which the motion reversing mechanism includes crank pins, radial slides and connecting crank arms arranged to avoid a dead center condition.

A further object is to provide a positively connected motion reversing device which is practically noiseless and which is strong and durable and economical of manufacture.

Various other objects and advantages will be more fully apparent from the following description of the accompanying drawings which form a part of this disclosure, and which illustrate a preferred form of embodiment of the invention.

Of the drawings:

Fig. 1 is an elevation, partly in section of my reversing device.

Fig. 2 is an enlarged axial section thereof.

Fig. 3 is a section on line 3—3, of Fig. 2.

Fig. 4 is a section on line 4—4 of Fig. 2.

Fig. 5 is a section on line 5—5 of Fig. 2.

Fig. 6 is a perspective view of one of the casing members, showing the slide grooves.

Fig. 7 is a perspective view of the opposed casing members.

Figs. 8 and 9 are diagrammatic views illustrating the principle of operation.

Referring particularly to Fig. 1, which shows one adaptation of the device of the present invention, the reversing mechanism proper is contained in a casing comprising two intermeshing casing members 1, 2 and two end plates 3, 4 all secured together by bolts 5, the plate 3 having a hub 6 provided with clutch teeth 7, and the plate 4 having a hub 8 provided with clutch teeth 9. The drive shaft 10 is rotatable in the plate 3 and in a fixed bearing 11, and a clutch element 12 having clutch teeth 13, is slidably keyed to the shaft 10 and may be operated by a clutch lever 14 to clutch the casing to the drive shaft for a direct forward drive, as will later be explained.

The driven shaft 15, which aligns with the driving shaft, is rotatable in the plate 4 and in a fixed bearing 16. I provide means for holding the casing fixed at will. For this purpose I provide a clutch element 17 having clutch teeth 18, and slidably keyed to the elongated hub of said bearing and operable by a clutch lever 19 to clutch the casing to the fixed bearing 16 for a reverse drive, as will later be explained.

The casing member 1 has a boss 20 of slightly reduced diameter which is provided with radial grooves 21, 22, 23, 24 merging together at the center of the boss, with the opposite grooves relatively aligned to form in effect a continuous diametric groove. (See particularly Figs. 4 and 6.) The opposite or outer end of the casing member 1 is recessed to provide a chamber 25 with a partition wall 26 separating the chamber from the base of the grooves. The wall 26 at the base of each groove has an elongated slot 27, the purpose of which will be later explained.

The inner end of the casing member 2 is recessed as at 28 to a depth corresponding to the height of the boss 20 of the member 1 and the opposite or outer end is recessed to provide a chamber 29, the recess 28 and chamber 29 being separated by a partition wall 30, having four radial elongated slots 31.

In assembling the casing, the boss 20 of the member 1 fits into the recess 28 of the member 2 with the peripheral wall of said recess closing the ends of the several grooves and the partition wall 30 closing the open sides thereof, the slots 31 being aligned with and equal in length with the slots 27. (See Fig. 2.)

The end plates 3 and 4 close the chambers 25 and 29 when the casing is completely assembled, said plates having peripheral flanges 32 overlapping the adjacent casing members.

Slide members are provided guided in the casing so that each slide travels in a substantially radial direction toward and from the axes of the shafts, that is, they travel in a direction transverse to the axial plane, If only two slides are used their lines of travel preferably intersect.

These slide members 21ª, 22ª, 23ª, 24ª are slidable in the respective companion grooves 21, 22, 23, 24 and are provided with transverse wrist pins 21ᵇ, 22ᵇ, 23ᵇ, 24ᵇ, each extending into the chamber 25 through one of the respective slots 27, and opposed relatively aligned wrist pins 21ᶜ, 22ᶜ, 23ᶜ, 24ᶜ, each extending in the opposite direction through one of the respective slots 31 and into the chamber 29, the wrist pins, as shown in Fig. 2, being preferably made integral with the respective slide members.

The slides are disposed in pairs, the individuals of each pair being opposed to each other diametrically, and they also travel in opposite directions from each other at any instant. This insures balancing of the inertia forces. The line of travel of one pair of slides is preferably at right angles to that of the other.

The drive shaft 10 carries a two throw crank element positioned in the chamber 25 and including a crank pin 33 and an opposed crank pin 34, and the driven shaft 15 carries a similar two throw crank element positioned in the chamber 29 and including a crank pin 35 and an opposed crank pin 36.

The drive shaft 10 is in positive driving connection with the several slides by means of links or connecting rods positioned in the chamber 25 and including a link 37 connecting the crank pin 33 with the wrist pin 22ᵇ of the slide 22ª, a companion link 38 connecting the pin 33 with wrist pin 23ᵇ of the slide 23ª, a link 39 connecting the opposed crank pin 34 with the wrist pin 24ᵇ of the slide 24ª, and a companion link 40 connects the crank pin 34 with the wrist pin 21ᵇ of the slide 21ª.

In the chamber 29 are positioned other links which positively connect the slides with the driven shaft and which include a link 41 connecting the crank pin 35 with the wrist pin 22ᶜ of the slide 22ª, a companion link 42 connecting the pin 35 with the wrist pin 21ᶜ of the slide 21ª, a link 43 connecting the opposed crank pin 36 with the wrist pin 24ᶜ of the slide 24ª, and a companion link 44 connecting the pin 36 with the wrist pin 23ᶜ of the slide 23ª.

The various connections are clearly illustrated in Fig. 8, and from an examination of said figure the various operations will be fully understood. When the clutch 17 engages the casing 1 said casing will be held against rotation, and if in this instance the shaft 10 is rotated in the direction of the arrow 46 in Fig. 8, the several radial slides will be reciprocated as indicated by the several arrows 47, and the shaft 15 rotated in a direction indicated by the arrow 48 which will be reverse to the direction of rotation of the shaft 10.

If the clutch 17 is disengaged, allowing a free rotation of the casing 1, it will be evident that the shaft 15 will then likewise rotate in a direction reverse to that of the shaft 10 but at one half the speed.

Further, if the clutch 17 is disengaged and the clutch 12 engaged the casing 1 then becomes fixed to and bodily rotatable with the shaft 10 and in consequence there is provided a direct drive between the two shafts.

In Fig. 9 I have illustrated the principle of the invention in its simplest form, this including only two radial slides at right angles to each other and with one shaft having only a single crank pin. The operation of this simple form is the same as is that of the four slide type, the main advantage of the four slide type residing in the provision of a better balanced device and a more uniform distribution of strains and stresses.

Although I have herein referred to the shaft 10 being the drive shaft it will be obvious that either shaft can be the drive shaft and the other the driven shaft, and further, while the shafts are specifically shown as having crank-pins, the term as used in the claims is intended to include such mechanical equivalents as will give a crank action.

It will be noted that in the embodiment of the invention set forth above every moving part has a corresponding part which at any instant is moving in an opposite direction to it. For these reasons the inertia force of the cranks and slides are balanced.

While the form of mechanism herein illustrated and described is well adapted to fulfil the objects primarily stated it is to be understood that it is not intended to confine the invention to the embodiment herein disclosed, for it is susceptible of embodiment in various other forms all coming within the scope of the following claims.

I claim:

1. In a device of the nature disclosed, a casing, a shaft having a crank element, a second shaft in substantial alignment with the first named shaft, and having two diametrically opposed crank elements, slides carried by the casing and each movable transversely towards and from the axes of the shafts, the line of movement of one slide intersecting the line of movement of the other slide, means connecting the two said diametrically opposed crank elements each with one of the slides, and means connecting the crank element of the first shaft with both slides.

2. In a device of the nature disclosed, a casing, a shaft having a crank-pin, a second shaft in substantial alignment with the first shaft, and having two diametrically opposed crank-pins, two slides carried by the casing and each movable transversely towards and from the axes of the shafts, the line of movement of one slide intersecting the line of movement of the other slide, means connecting the two crank-pins each with one of the slides, and means connecting the crank-pin of the first shaft with both slides.

3. In a device of the nature disclosed, a casing, a drive shaft having diametrically opposed crank elements, a driven shaft having diametrically opposed crank elements, a pair of opposed slides, a second pair of opposed slides, all of said slides carried by the casing so as to travel substantially radial towards and from the axes of the shafts, with each slide traveling reversely to its opposed slide, and means connecting each crank element to two angularly adjacent slides, the drive shaft crank elements connecting with diametrically opposite pairs of said slides and the driven shaft connecting likewise with diametrically opposite pairs of said slides which last named pairs include one of each of the pairs of slides connected with the drive shaft.

4. In a device of the nature disclosed, a casing, a shaft having a crank element, a second shaft substantially aligned with the first named shaft, and having two diametrically opposed crank elements, slides carried by the casing and mounted so as to travel substantially radially towards and from the axes of the shafts, the line of travel of one slide being substantially at right angles to the line of travel of the other slide, means connecting the two crank elements each with one of the slides, means connecting the crank element of the first shaft with both slides, and means maintaining the casing against rotation to cause a reverse rotation of one shaft relative to the other.

5. In a device of the nature disclosed, a casing, a shaft having a crank-pin, a second shaft substantially aligned with the first named shaft, and having two diametrically opposed crank-pins, two slides carried by the casing and mounted so as to travel substantially radially towards and from the axes of the shafts, the line of travel of one slide being substantially at right angles to the line of travel of the other slide, means connecting the two crank-pins each with one of the slides, means connecting the crank-pin of the first shaft with both slides, and means maintaining the casing against rotation to cause a reverse rotation of one shaft relative to the other.

6. In a device of the nature disclosed, a casing, a drive shaft having diametrically opposed crank elements, a driven shaft having diametrically opposed crank elements, a pair of opposed slides, a second pair of opposed slides, all of said slides carried by the casing and traveling transversely towards and from the axial plane of the shafts, with each slide traveling reversely to its opposed slide, means connecting each crank element to two angularly adjacent slides, the drive shaft crank elements connecting with diametrically opposite pairs of said slides and the driven shaft connecting likewise with diametrically opposite pairs of said slides which last named pairs include one of each of the pairs of slides connected with the drive shaft, and means maintaining the casing against rotation to cause a reverse rotation of one shaft relative to the other.

7. In a device of the nature disclosed, a casing, a shaft having a crank element, a second shaft substantially aligned with the first named shaft, and having two diametrically opposed crank elements, slides carried by the casing and movable substantially radially so as to travel transversely towards and from the axes of the shafts, the line of movement of one slide being substantially at right angles to the line of movement of the other slide, means connecting the two crank elements each with one of the slides, means connecting the crank element of the first shaft with both slides, means maintaining the casing against rotation to cause a reverse rotation of one shaft relative to the other and releasable to permit a rotation of the casing, and means for connecting the casing to one shaft at will to provide a direct driving connection between the two shafts.

8. In a device of the nature disclosed, a casing, a shaft having a crank-pin, a second shaft substantially aligned with the first named shaft, and having two diametrically opposed crank-pins, two slides carried by the casing and movable substantially radially so as to travel transversely towards and from the axial plane of the shafts, each slide moving in a plane substantially at right angles to the plane of movement of the other, means connecting the two crank-pins each with one of the slides, means connecting the crank-pin of the first shaft with both slides, means for maintaining the casing against rotation at will to cause a reverse rotation of one shaft relative to the other and releasable to permit a rotation of the casing, and means for connecting the casing to one shaft at will to provide a direct driving connection between the two shafts.

9. In a device of the nature disclosed, a casing, a drive shaft having diametrically opposed crank elements, a driven shaft having diametrically opposed crank elements, four slides carried in opposed pairs by the casing and traveling transversely towards and from the axial plane of the shafts, with each slide traveling reversely to its opposed slide, means connecting each crank element to two angularly adjacent slides, the drive shaft crank elements connecting with diametrically opposite pairs of said slides and the driven shaft connecting likewise with diametrically opposite pairs of said slides which last named pairs include one of each of the pairs of slides connected with the drive shaft, means for maintaining the casing against rotation at will to cause a reverse rotation of one shaft relative to the other and releasable to permit a rotation of the casing, and means for connecting the casing at will to one shaft to provide a direct driving connection between the two shafts.

10. In a device of the nature disclosed, a driving shaft, a driven shaft in substantial alignment with the driving shaft, a pair of diametrically oppositely disposed slides, means for guiding the same in a substantially radial direction to and from the axis of the shafts, means for driving the slides to and from the driving shaft and operating to move the slides in opposite directions at any instant and means connecting the slides to the driven shaft and operating to drive the driven shaft in a reverse direction from the driving shaft.

11. In a device of the nature disclosed, a driving shaft, a driven shaft in substantial alignment with the driving shaft, a pair of diametrically oppositely disposed slides, means for guiding the same to slide to and from the axes in a substantially radial direction, said driving shaft having a pair of diametrically opposite crank pins, a connecting rod connecting each of said crank pins with its corresponding slide, whereby the crank pins operate to move each slide in an opposite direction to the other slide at any given instant, a pair of diametrically opposite crank pins carried by the driven shaft, a connecting rod connecting each of the last named crank pins with its corresponding slide and operating to drive the driven shaft in a reverse direction from the driving shaft.

Signed at Los Angeles, California, this 14th day of April, 1922.

STEVE CRESSEY.

Witnesses:
CLARENCE B. FOSTER,
L. BELLE WEAVER.